(12) United States Patent
Li et al.

(10) Patent No.: US 11,635,347 B2
(45) Date of Patent: Apr. 25, 2023

(54) SYSTEM FOR REDUCING FRICTION-INDUCED WEAR OF PIPE

(71) Applicant: TAIWAN SEMICONDUCTOR MANUFACTURING COMPANY LTD., Hsinchu (TW)

(72) Inventors: Po Yao Li, Hsinchu (TW); Shao Chang Tu, Hsinchu (TW); Tsung-Ying Wu, Hsinchu (TW); Wei Chih Lin, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 424 days.

(21) Appl. No.: 16/595,045

(22) Filed: Oct. 7, 2019

(65) Prior Publication Data
US 2020/0132227 A1 Apr. 30, 2020

Related U.S. Application Data

(60) Provisional application No. 62/753,376, filed on Oct. 31, 2018.

(51) Int. Cl.
| | | |
|---|---|---|
| *G01M 13/04* | (2019.01) | |
| *G01M 13/045* | (2019.01) | |
| *F16L 3/16* | (2006.01) | |
| *F16L 3/02* | (2006.01) | |

(52) U.S. Cl.
CPC ............ *G01M 13/045* (2013.01); *F16L 3/02* (2013.01); *F16L 3/16* (2013.01)

(58) Field of Classification Search
CPC . G01M 13/045; F16L 3/02; F16L 3/16; F16L 3/06; F16L 55/035
USPC .......................................................... 73/54.24
See application file for complete search history.

(56) References Cited

U.S. PATENT DOCUMENTS

| | | | |
|---|---|---|---|
| 10,240,820 B2* | 3/2019 | Ash ..................... | F24S 25/636 |
| 2008/0032066 A1 | 2/2008 | Stiblert et al. | |
| 2014/0314594 A1* | 10/2014 | Jones ................. | A61B 17/8822 417/415 |
| 2018/0326933 A1* | 11/2018 | Pahisson ............. | B60R 16/0215 |
| 2019/0269383 A1* | 9/2019 | Wood .................. | A61B 8/4405 |
| 2020/0271242 A1* | 8/2020 | McDonald ............ | A62C 33/04 |

FOREIGN PATENT DOCUMENTS

| | | |
|---|---|---|
| CN | 2038850 U | 6/1989 |
| CN | 2165281 Y | 5/1994 |
| CN | 2853468 Y | 1/2007 |

(Continued)

OTHER PUBLICATIONS

Notice of Allowance dated Jul. 31, 2020 from corresponding application No. TW 108139129.

(Continued)

*Primary Examiner* — Muhammad Ijaz
(74) *Attorney, Agent, or Firm* — Hauptman Ham, LLP

(57) ABSTRACT

A buffer for holding a pipe adapted to transport a fluid is provided. The buffer includes a base, a plurality of fingers extending outwardly from a first side of the base. A first finger of the plurality of fingers and a second finger of the plurality of fingers define a cavity for receiving the pipe. The buffer further includes at least one roller on a second side of the base opposite the first side.

20 Claims, 7 Drawing Sheets

(56) References Cited

FOREIGN PATENT DOCUMENTS

| | | |
|---|---|---|
| CN | 201166193 Y | 12/2008 |
| CN | 101666419 A | 3/2010 |
| CN | 102741067 A | 10/2012 |
| CN | 203409680 | 1/2014 |
| CN | 205280662 U | 6/2016 |
| CN | 206208470 U | 5/2017 |
| CN | 107791195 | 3/2018 |
| CN | 207500628 U | 6/2018 |
| CN | 207711805 U | 8/2018 |
| CN | 108627571 | 10/2018 |
| KR | 101654121 | 9/2016 |
| TW | 201422959 | 6/2014 |

OTHER PUBLICATIONS

Office Action dated Mar. 3, 2021 for corresponding case No. CN 201911051107.8 (pp. 1-10).
Office Action dated Oct. 22, 2021 for corresponding case No. CN 201911051107.8 (pp. 1-11).

* cited by examiner

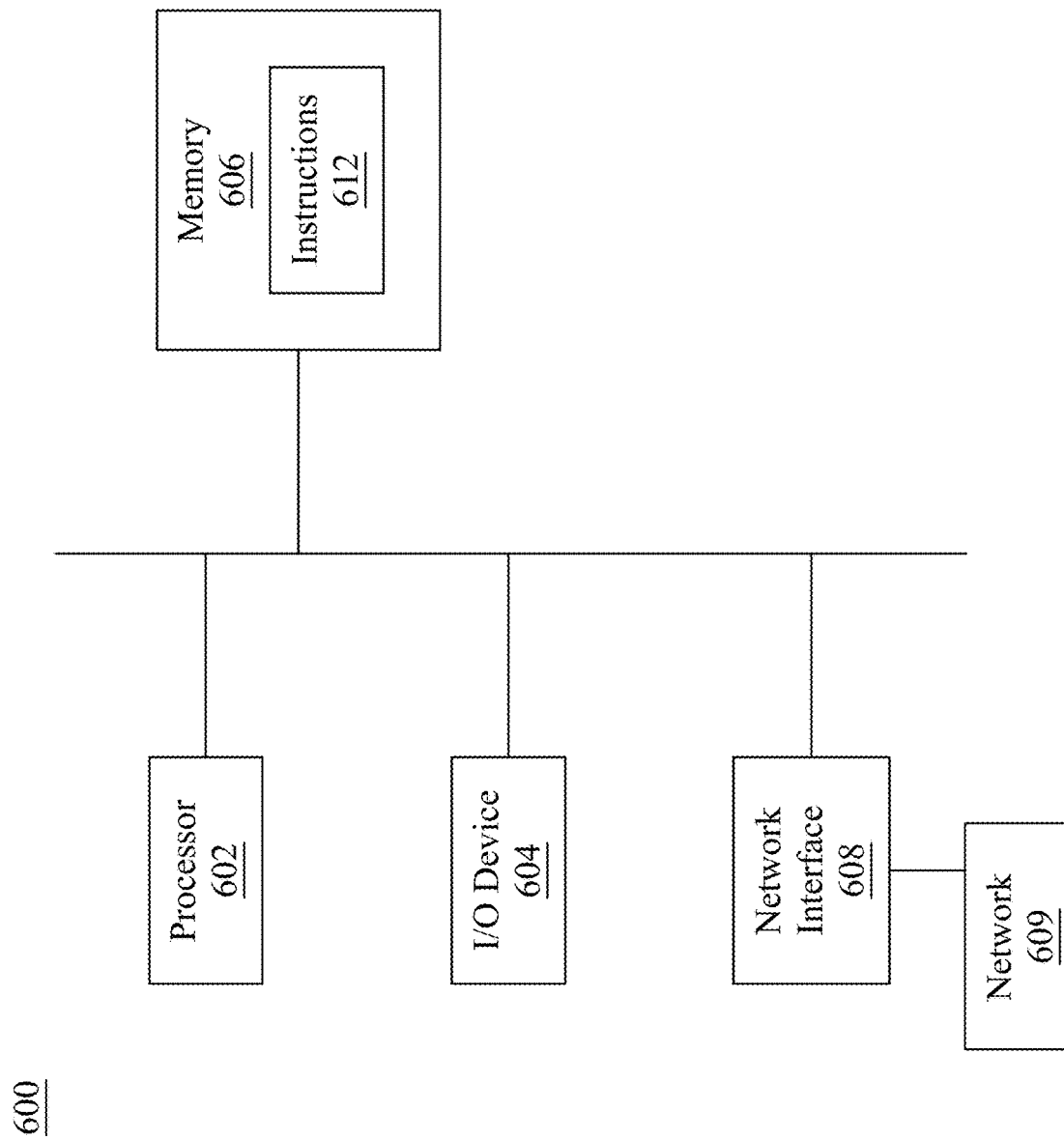

SYSTEM FOR REDUCING FRICTION-INDUCED WEAR OF PIPE

PRIORITY CLAIM

This application claims priority to U.S. Provisional Patent Application Ser. No. 62/753,376 filed Oct. 31, 2018, which is incorporated herein by reference in its entirety.

BACKGROUND

In the manufacture of integrated circuits, hundreds of processing steps, including deposition, photolithography, chemical mechanical planarization (CMP), ion implantation, diffusion, etching and cleaning, are used to fabricate circuit components on a semiconductor wafer. Numerous semiconductor processing tools are utilized during the fabrication of integrated circuits.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is a schematic diagram of a controller system, in accordance with some embodiments

DETAILED DESCRIPTION

Figure 1:
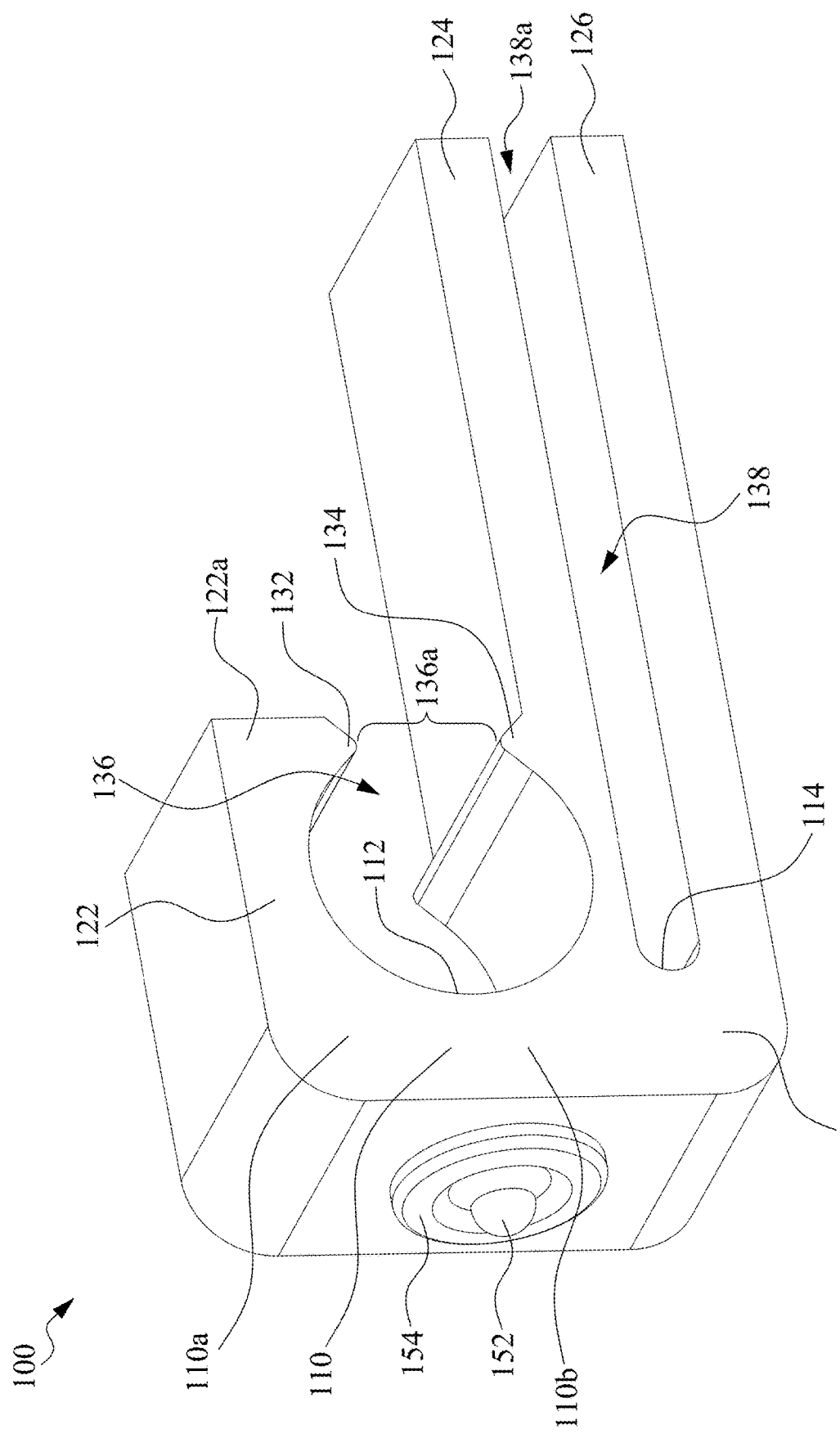
FIG. 1 is a perspective view of a buffer that is usable to reduce friction-induced wear of a pipe for transporting a fluid, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. System may be otherwise oriented (rotated 90 degrees or at other orientations) and the spatially relative descriptors used herein may likewise be interpreted accordingly.

Pipes such as plastic pipes made of Teflon™ fluoropolymers are widely used to distribute fluids throughout a semiconductor fabrication facility. Fluoropolymers are chemically inert, thus reducing the risk of contamination and on-wafer defects associated with metal pipes. In some instances, in various fabrication steps for formation of integrated circuits, process fluids, including process gasses and process liquids, are utilized. Process fluids are stored in tanks and are transported from tanks to semiconductor processing tools in which the process fluids are used by way of pipes. In some instances, in fabrication of integrated circuits, various fabrication processes are conducted in semiconductor processing tools. These semiconductor processing tools include processing chambers used in chemical vapor deposition (CVD), physical vapor deposition (PVD), or growing native oxides such as silicon oxide. Components inside the processing chambers are heated up during the deposition operation. To maintain temperature in the processing chambers, a cooling system is provided to control the temperatures of processing chambers. The cooling system circulates a cooling liquid such as water or a mixture of water and glycol through pipes to remove heat from the processing chambers.

Initially, a pipe is maintained in a state of being aligned in a straight line. However, with the increasing time duration in use of the pipe, the pipe ages. Sagging or drooping of the pipe occurs due to gravity or other forces, and excessive sagging or drooping of the pipe causes the pipe to touch a support plate (e.g., a metal plate) where the semiconductor processing tools are placed. As a fluid is transported through the pipe, the pipe vibrates and rubs against the surface of the support plate which has a high coefficient of friction. Over time, the friction between the pipe and the surface of the support plate causes the pipe to break, resulting in a leakage of the fluid that flows through the pipe. The fluid leakage exposes workers to the leaked fluid or causes shorts of electronic components in the semiconductor fabrication facility, thus compromising the fabrication of integrated circuits.

A buffer is provided to help to prevent the friction-induced damages to the fluid-transporting pipes used in a semiconductor fabrication facility. The buffer is configured to support and elevate a fluid-transporting pipe, thereby helping to prevent the fluid-transporting pipe from rubbing against a support plate where semiconductor processing tools are placed. The buffer includes a material having a coefficient of friction lower than the coefficient of friction of the surface material of the support plate so as to provide a low friction contact between the pipe and the buffer. Separating the fluid-transporting pipe from the support plate using a low friction buffer thus helps to improve the durability of the fluid-transporting pipe. One or more rollers are provided at the bottom of the buffer which allow the buffer to move in any direction on the support plate. The one or more rollers reduce the contact area between the buffer and the support plate, thereby helping to reduce the friction between the buffer and the support plate. As a result, the lifetime of the buffer is increased. The wear of the one or more rollers is monitored by an acoustic sensor configured to detect sound waves generated as the one or more rollers move on the support plate. When an abnormal sound wave caused by the wear of the one or more rollers is detected by the acoustic sensor, an operator is notified to determine when to replace the worn rollers before any damage to the pipe occurs.

FIG. 1 is a perspective view of a buffer 100 that is usable to hold a pipe so as to reduce friction-induced cracking of the pipe, in accordance with some embodiments. In some embodiments, the pipe is adapted to transport a fluid in a fluid supply system in a semiconductor fabrication facility.

Referring to FIG. 1, the buffer 100 includes a base 110, a plurality of fingers (e.g., fingers 122, 124 and 126) extending outwardly from one side of the base 110 and spaced from each other, and one or more rollers 152 on an opposite side of the base 110 from the plurality of fingers 122, 124 and 126. The number of the rollers 152 is determined by the size of the base 110. In some embodiments, the plurality of fingers 122, 124 and 126 and one or more rollers 152 have a unitary construction with the base 110, i.e., the base 110, the plurality of fingers 122, 124 and 126, and the one or more rollers 152 being integral with each other.

In some embodiments, the plurality of fingers includes a first finger 122 extending outwardly from a first end 110a of the base 110, a second finger 124 extending outwardly from a central portion 110b of the base 110, and a third finger 126 extending outwardly from a second end 110c of the base 110 opposite the first end 110a. The first finger 122 is configured to have a length less than a length of each of the second finger 124 and the third finger 126. In some embodiments, the second finger 124 and the third finger 126 have a same length. In some embodiments, the second finger 124 and the third finger 126 have different lengths. The first finger 122 includes a ridge 132 protruding from a free end 122a of the first finger 122 and toward the second finger 124. The second finger 124 includes a ridge 134 protruding from the second finger 124 and toward the first finger 122. The ridges 132 and 134 face each other and define an open end 136a of a cavity 136 formed by the first finger 122, a first segment of the base 110 (herein referred to as a first base segment 112), and a portion of the second finger 124. The cavity 136 is configured to receive a pipe 142 (FIG. 2) for transporting a fluid (also referred to as fluid-transporting pipe) when the buffer 100 is in use. In some embodiments, the cavity 136 is C-shaped having a curved inner surface. The dimension of the cavity 136 is determined based on the size of the fluid-transporting pipe 142 to be held therein. In some embodiments, the cavity 136 is dimensioned to fit a one-inch pipe. In some embodiments, the cavity 136 is dimensioned to fit a three-quarter-inch pipe. In some embodiments, the cavity 136 has greater or lesser dimensions for different diameter pipes. The open end 136a of the cavity 136 from which the fluid-transporting pipe 142 is inserted is configured to have a dimension less than a diameter of the fluid-transporting pipe 142 such that once the fluid-transporting pipe 142 is forced into the cavity 136, the cavity 136 holds the fluid-transporting pipe 142 firmly in place. The dimension of the open end 136a of the cavity 136 is determined by the heights of the ridges 132 and 134. The second finger 124, the third finger 126, and a second segment of the base 110 (herein referred to as second base segment 114) define a cavity 138. In some embodiments, the second base segment 114 has a curved surface. The dimension of the cavity 138 is configured to accommodate an electrical cable 144 (FIG. 2) when the buffer 100 is in use. In some embodiments, the cavity 138 has a uniform dimension that is less than a diameter of the electrical cable 144 such that once the electrical cable 144 is forced into the cavity 138, the electric cable 144 is pressed by the second finger 124 and the third finger 126, which prevents the electrical cable 144 from sliding out of the cavity 138. In some embodiments, the cavity 138 is slanted such that the dimension of the cavity 138 reduces gradually towards the free ends of the second finger 124 and the third finger 126. In some embodiments, an open end 138a of the cavity 138 is configured to have a dimension less than the diameter of the electrical cable 144. The smaller dimension of the open end 138a of the cavity 138 helps to prevent the electrical cable 144 from sliding out of the cavity 138 once the electrical cable 144 is received into inner portion of the cavity 138 The third finger 126 is optional, and in some embodiments, the third finger 126 is omitted. In the embodiments where the third finger 126 is omitted, the second finger 124 is present at the second end 110c of the base 110.

The one or more rollers 152 are protrusions protruding from the base 110 of the buffer 100 and are adapted to allow the buffer 100 to move in any direction. The one or more rollers 152 are configured to reduce the friction between the buffer 100 and a support plate 102 (FIG. 2) over which the buffer 100 is placed. In some embodiments, each roller 152 of the one or more rollers 152 is a hemispherical-shaped protrusion having a rounded bottom side adapted to contact the support plate 102 when the buffer 100 is in use. The rounded bottom side reduces the contact area between the buffer 100 and the support plate 102, thereby helping to reduce the friction between the buffer 100 and the support plate 102 and to increase the durability of the buffer 100. The buffer 100 also includes a ring 154 surrounding each roller 152. The ring 154 is optional, and in some embodiments, the ring 154 is omitted.

In some embodiment, the buffer 100 includes a material having a lower coefficient of friction than the material of the underlying support plate. As used herein, coefficient of friction refers to a kinetic coefficient of friction which is defined as the ratio of the normal force required to maintain a steady state motion of an object sliding on a given surface. In some embodiments, the support plate includes metal such as iron. In some embodiments, the support plate includes wood or plywood. In some embodiments, the coefficient of friction of the low friction material of the buffer 100 is less than 0.1. In some embodiments, the buffer 100 includes polytetrafluoroethylene (PTFE), perfluoroalkoxy (PFA), fluorinated poly ethylene propylene (FPEP), polyvinylidene fluoride (PVDF), polysulfone, or polyether ether ketone (PEEK).

Figure 2:
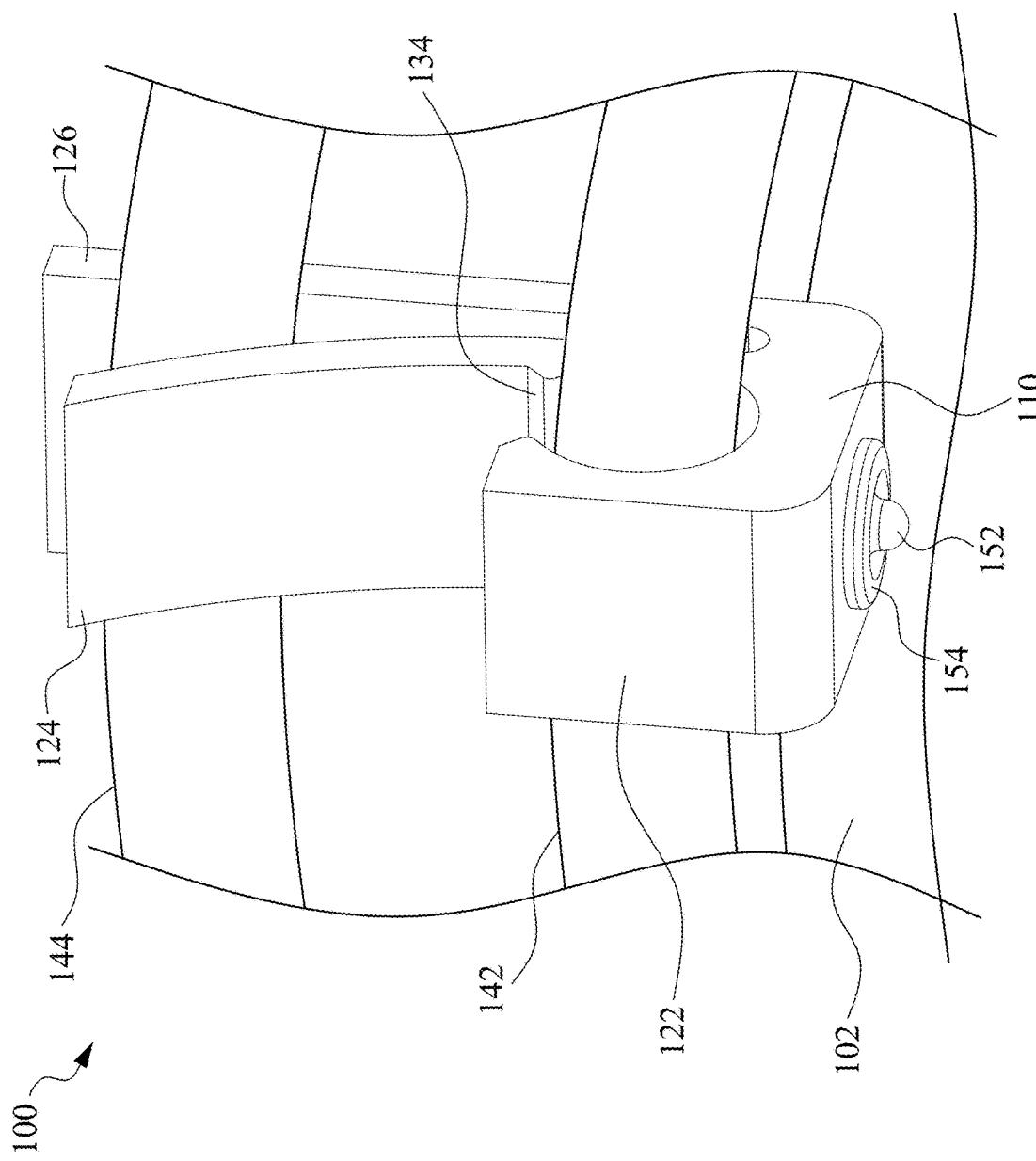
FIG. 2 is a perspective view of a buffer holding a fluid-transporting pipe and an electrical cable over a support plate, in accordance with some embodiments.

FIG. 2 is a perspective view of a buffer 100 holding a fluid-transporting pipe 142 and an electrical cable 144 over a support plate 102, in accordance with some embodiments. In FIG. 2, the buffer 100 is configured to hold the fluid-transporting pipe 142 and the electrical cable 144 in the cavities 136 and 138, respectively. The buffer 100 thus acts as a cushion to avoid the direct contact of the fluid-transporting pipe 142 and the electrical cable 144 with the support plate 102, which helps to eliminate the effect of the high friction force applied on the fluid-transporting pipe 142 and the electrical cable 144 by the support plate 102. The low friction material used in the buffer 100 provides low friction contact surfaces when the fluid-transporting pipe 142 and the electrical cable 144 are received in the cavity 136 and the cavity 138 of the buffer 100, respectively. As a result, the friction-induced wear of the fluid-transporting pipe 142 or the electrical cable 144 is reduced, and the usable time of the fluid-transporting pipe 142 or the electrical cable 144 is increased.

Figure 3:
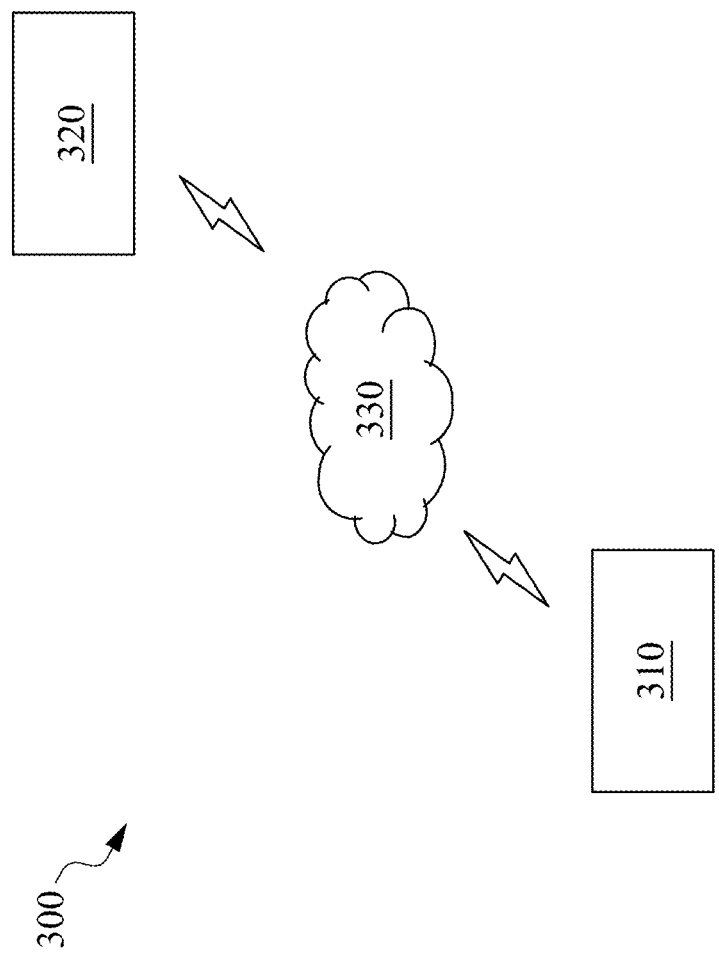
FIG. 3 is a schematic diagram of a system for monitoring the wear of one or more rollers in the buffer over time, in accordance with some embodiments.

FIG. 3 is a schematic diagram of a system 300 for monitoring the wear of one or more rollers 152 in the buffer 100 over time, in according with some embodiments.

Referring to FIG. 3, the system 300 includes an acoustic sensor 310 and a sensor control unit 320. The acoustic sensor 310 is adapted to detect acoustic waves generated during the use of the buffer 100 due to the vibration of the one or more rollers 152 caused by the friction force between the one or more rollers 152 and the support plate 102. As a roller 152 wears, the height of the roller 152 reduces due to the friction between the roller 152 and the support plate 102 (FIG. 2). Consequently, the contact area between the roller 152 and the support plate 102 increases with time. The frequencies of the acoustic waves measured by the acoustic sensor 310 thus change over time with the increased contact area between the roller 152 and the support plate 102. The changes in frequencies of the acoustic waves are usable to evaluate the amount of the wear of the roller 152.

Figure 3A:
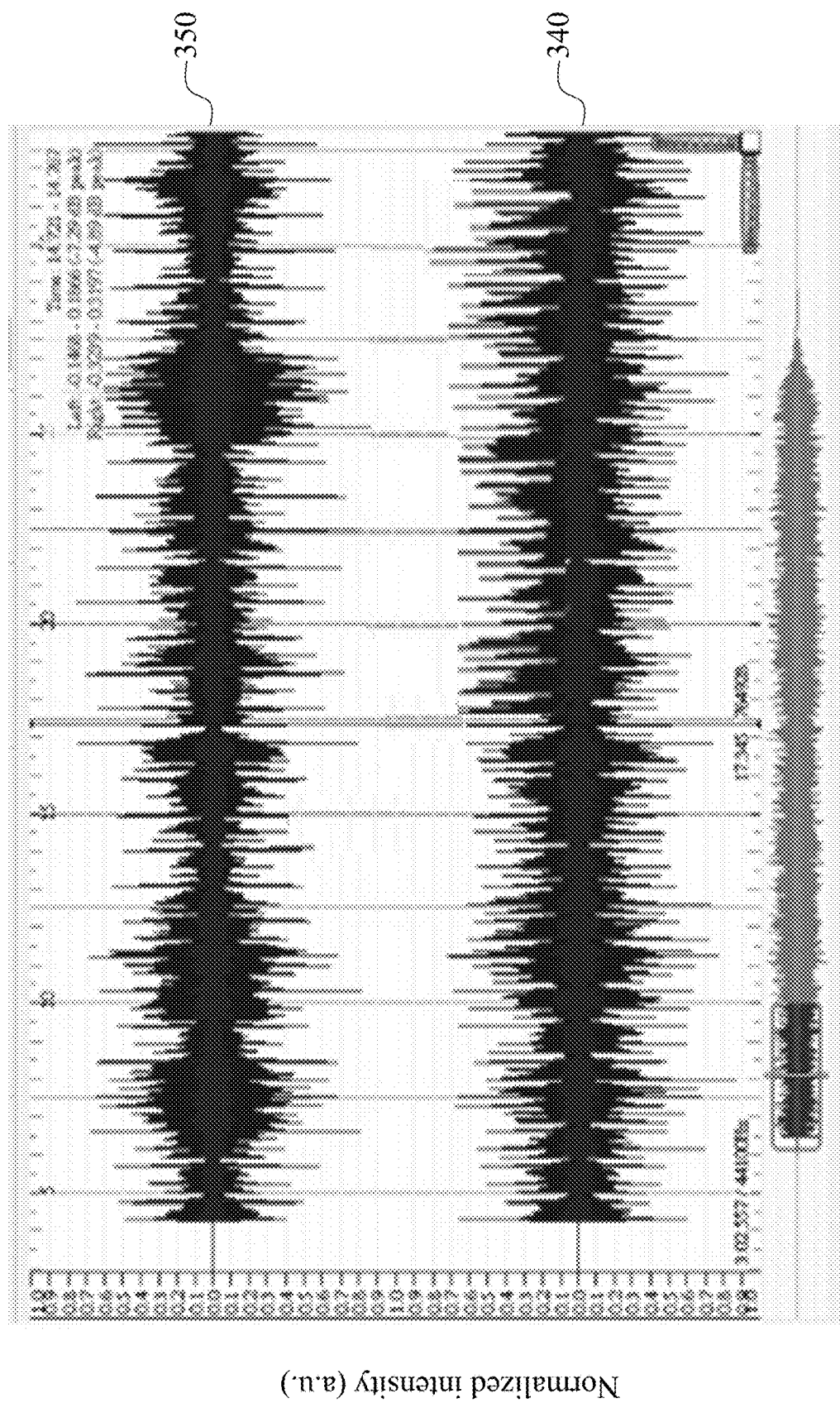
FIG. 3A is a plot illustrating changes in acoustic wave intensity as a buffer wears, in accordance with some embodiments.

FIG. 3A is a plot illustrating changes in acoustic wave intensity as a buffer 100 wears, in accordance with some embodiments. Curve 340 illustrates an initial acoustic wave intensity of a buffer 100 as a function of time. Curve 350 illustrates an acoustic wave intensity of the buffer 100 as a function of time after the roller 152 starts wearing when the buffer 100 has been used for a certain period of time. Compared to the curve 340 of the intensity of the initial acoustic wave, after the buffer 100 has been used for a certain period of time, the curve 350 of the intensity of the acoustic wave increases about 10 hertz (Hz).

The acoustic sensor 310 is placed close to the buffer 100 such that acoustic waves originated from the abrasive force between the one or more rollers 152 and the support plate 102 are able to be received by the acoustic sensor 310. In some embodiments, the acoustic sensor 310 is placed about 30 centimeter (cm) away from the buffer 100. If the distance between the acoustic sensor 310 and the buffer 100 is too great, the risk that the acoustic sensor 310 is not able to detect the acoustic waves increases. In some embodiments, the acoustic sensor 310 is an ultrasonic sensor usable to detect sound waves that are beyond an audible range of frequency to human ears, typically above 20 kilohertz (kHz). The ultrasonic sensor operates at high frequencies, and thus has high sensitivity in detecting the acoustic waves generated by the contact between the one or more rollers 152 and the support plate.

The sensor control unit 320 is adapted to analyze changes of frequencies of the acoustic waves detected by the acoustic sensor 310. Once an intensity of acoustic wave signals exceeds a threshold value that is associated with a normal operating condition of the one or more rollers 152, an operator is notified to replace the buffer 100 to avoid the excess abrasion between the buffer 100 and the support plate 102. In some embodiments, the threshold value is set to be 3300 Hz. In some embodiments, the sensor control unit 320 is a multichannel control unit. The sensor control unit 320 communicates wirelessly, for instance, via a communication network 330. In some embodiments, the sensor control unit 320 communicates via a wired connection with acoustic sensor 310. In some embodiments, the sensor control unit 320 is implemented by a controller system 600 (FIG. 6), and the communication network 330 is implemented by a network interface 608 in the controller system 600 (FIG. 6).

Figure 4:
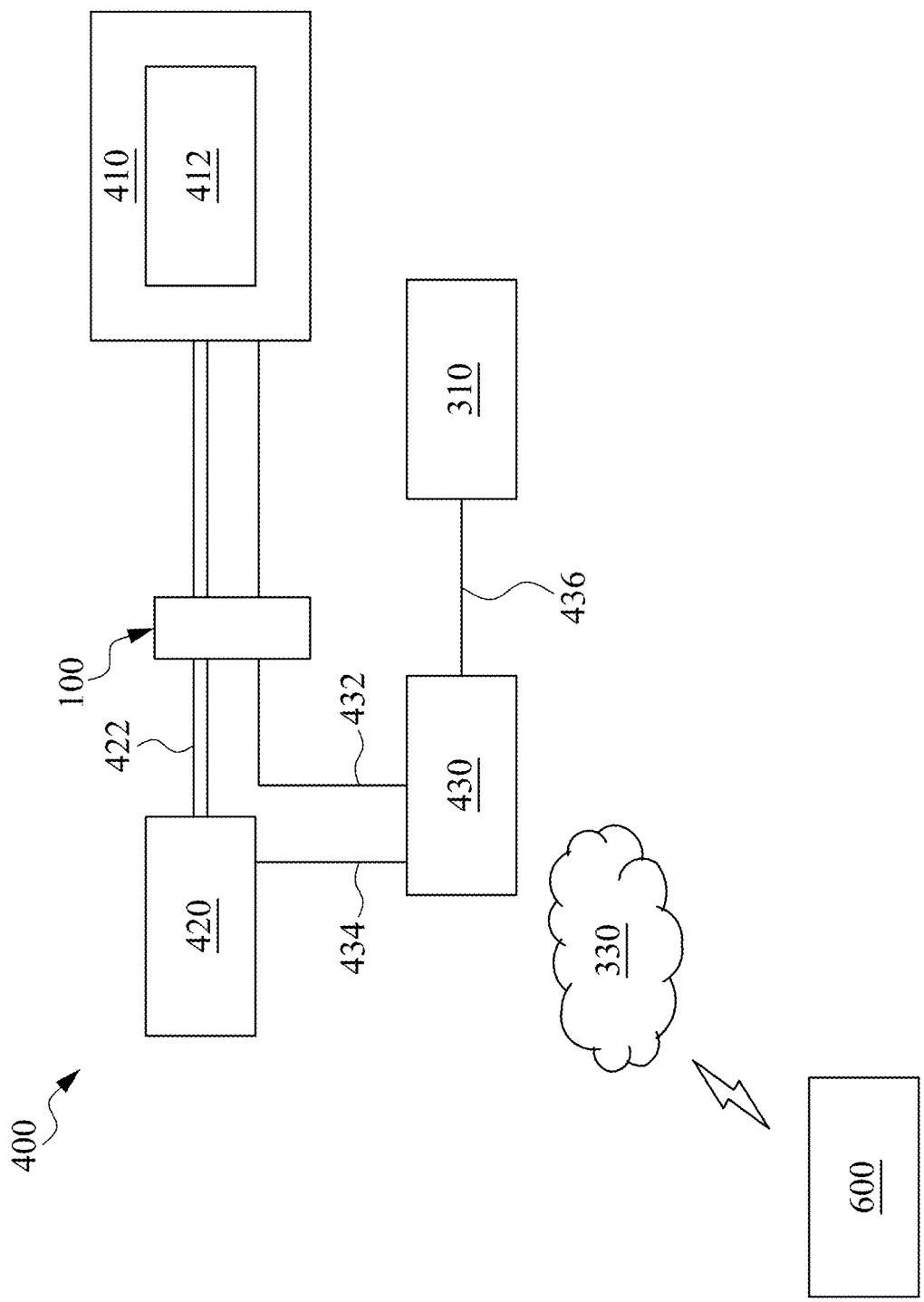
FIG. 4 is a schematic diagram of an arrangement in a semiconductor fabrication facility using a buffer, in accordance with some embodiments.

FIG. 4 is a schematic diagram of an arrangement 400 in a semiconductor fabrication facility using a buffer 100 of FIG. 1 to reduce the frication-induced wear of a pipe for transporting a fluid, in accordance with some embodiments.

Referring to FIG. 4, the arrangement 400 includes a semiconductor processing system 410, a fluid supply system 420, a power supply 430, and a controller system 600.

The semiconductor processing system 410 includes at least one processing chamber 412. The at least one processing chamber 412 is designed to perform one or more semiconductor manufacturing processes applied to one or more semiconductor wafers. In some embodiments, the processing chamber 412 is designed to perform the semiconductor manufacturing process, such as, deposition, thermal oxidation, implantation, lithography exposure, ion implantation, or etching. In some embodiments, the processing chamber 412 is a deposition tool, such as a chemical vapor deposition (CVD) tool or a physical vapor deposition (PVD) tool. In some embodiments, the processing chamber 412 is a CVD tool usable to form a dielectric layer on a semiconductor substrate for isolation. In some embodiments, the processing chamber 412 is a PVD tool usable to form a metal layer for interconnection. In some embodiments, the processing chamber 412 is an ion implantation tool usable to perform an ion implantation process for forming one or more doped features, such as source/drain regions or N-type or P-type wells, in a semiconductor wafer. In some embodiments, the processing chamber 412 is a chemical mechanical polishing (CMP) tool usable to polish a semiconductor wafer to reduce the thickness variation and provide a planarized surface. In some embodiments, the processing chamber 412 is a lithography tool usable to expose a photoresist layer on a semiconductor wafer using a radiation energy in order to form the patterned photoresist layer in assistance of other processing steps, such as etching, deposition, or ion implantation. In some embodiments, the semiconductor processing system 410 is a cluster system having multiple processing chambers configured to perform a same processing function or different processing functions (not shown). The processing chamber 412 shown in FIG. 4 is one processing chamber of the plurality of processing chambers in the cluster tool. In some embodiments, some processing chambers in the plurality of processing chambers are adopted for deposition of different materials, such as, for example, titanium nitride (TiN), titanium (Ti), and aluminum (Al), and some of processing chambers in the plurality of processing chambers are adopted for degassing, pre-cleaning, and cooling.

The fluid supply system 420 is adapted to supply a fluid for use in semiconductor processing operations. In some embodiments, the fluid supply system 420 supplies a slurry to the processing chamber 412 for CMP operation. In some embodiments, the fluid supply system 420 supplies a process gas or a process liquid to the processing chamber 412 for deposition operation. In some embodiments, the fluid supply system 420 supplies water to the processing chamber 412 for cooling components of the processing chamber 412.

The fluid is supplied to the processing chamber 412 via a fluid-transporting pipe 422. The fluid-transporting pipe 422 is supported by a buffer 100. In some embodiments, the fluid-transporting pipe 422 is made of a chemically inert material such as, for example, polytetrafluoroethylene (PTFE). In some embodiments, the fluid-transporting pipe 422 is provided as a linear pipe for transporting a process fluid to the processing chamber 412. In some embodiments, the fluid-transporting pipe 422 is provided as a coil-type pipe for distributing a cooling liquid to the processing chamber 412 or to a heat source (not shown).

The power supply 430 is usable to provide power to components of the semiconductor processing system 410, the fluid supply system 420 and the acoustic sensor 310. The power supply 430 is electrically connected to the semiconductor processing system 410, the fluid supply system 420, and the acoustic sensor 310 by respective electrical cables 432, 434 and 436. In some embodiments, the electrical cable 432 that electrically connects the semiconductor processing system 410 to the power supply 430 is received in the cavity 138 of the buffer 100 (FIG. 1).

The controller system 600 (described in detail in FIG. 6) is adapted to control the operations of semiconductor processing system 410, the fluid supply system 420 and the acoustic sensor 310.

The buffer 100 separates the fluid-transporting pipe 422 and the electrical cable 432 from a support plate over which the fluid-transporting pipe 422 and the electrical cable 432 are placed. The buffer 100 is made of a material having a lower coefficient of friction than the coefficient of friction of the support plate, thereby helping to reduce the friction-induced wear of the fluid-transporting pipe 422 and the electrical cable 432. Using a buffer 100 increases the usable lifetime of the fluid-transporting pipe 422 and the electrical cable 432. As a result, downtime of the semiconductor processing system 410 caused by the changing of the worn pipe is reduced. The buffer 100 also separates the electrical cable 432 from the support plate, and thus helps to reduce the risk of shorts caused by the leaked liquid when the fluid-transporting pipe 422 breaks.

Figure 5:
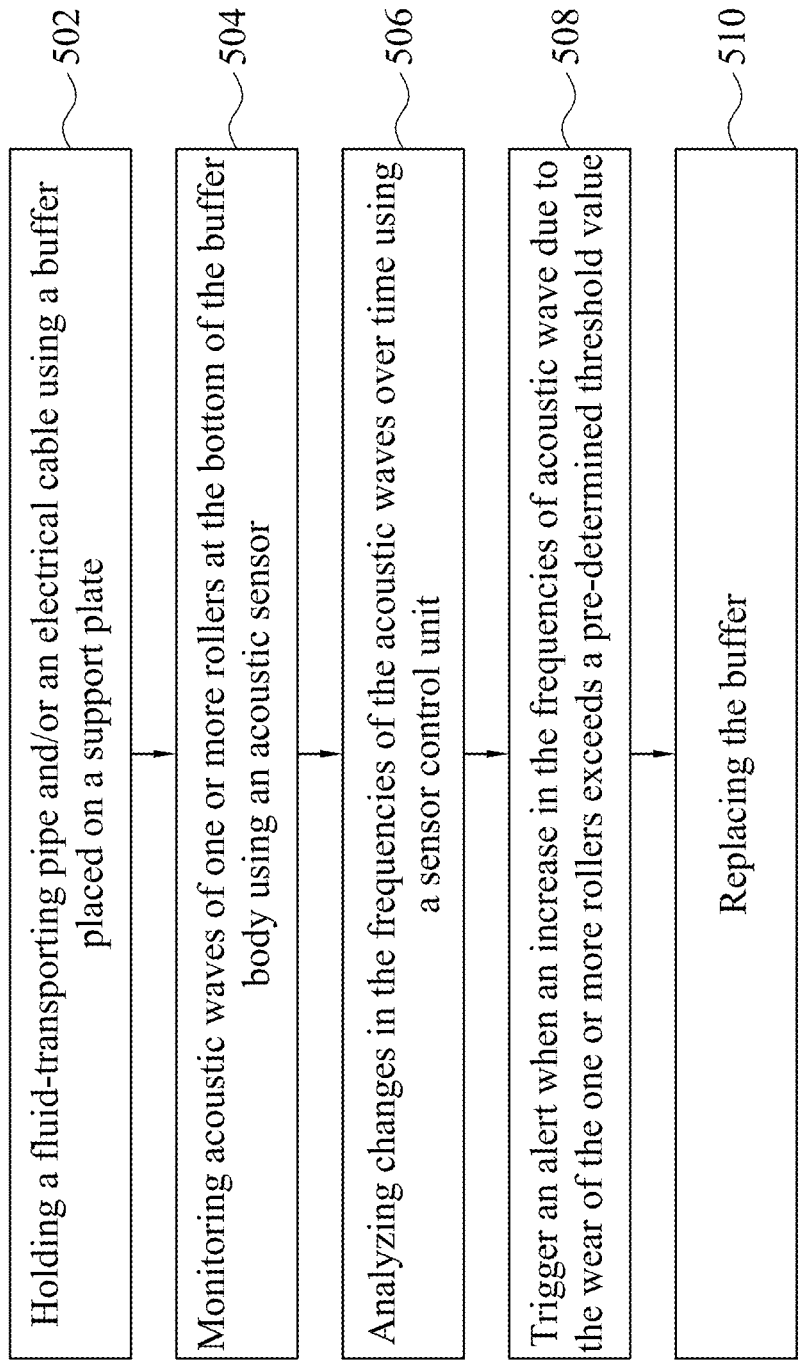
FIG. 5 is a flow chart of a method for monitoring the wear of one or more rollers in a buffer, in accordance with some embodiments.

FIG. 5 is a flow chart of a method 500 for monitoring wear of one or more rollers 152 in a buffer 100, in accordance with some embodiments. In some embodiments, additional processes are performed before, during, and/or after the method 500 in FIG. 5, and some of processes described herein are replaced or eliminated in some embodiments.

In operation 502, a buffer 100 is provided to separate a fluid-transporting pipe 142 and/or an electrical cable 144 from a support plate 102. The support plate 102 is made of a material having a coefficient of friction higher than the coefficient of friction of the material that provides the buffer 100. In some embodiments, the fluid-transporting pipe 142 and the electrical cable 144 are connected to a semiconductor processing system 410 in a semiconductor fabrication facility.

In operation 504, acoustic waves generated by the vibration of one or more rollers 152 provided at the bottom of the buffer 100 are continuously monitored using an acoustic sensor 310.

In operation 506, changes in frequencies of the acoustic waves over time are analyzed using a sensor control unit 320 to determine the wearing status of the one or more rollers 152.

In operation 508, after an increase of acoustic wave intensity due to the wear of the one or more rollers 152 exceeds a threshold value that is associated with a normal working condition of the one or more rollers 152, the sensor control unit 320 triggers an alert to notify an operator that the buffer 100 is worn and needs to be replaced. In some embodiments, when the increase of intensity of the acoustic wave is above 3300 Hz, the alert is triggered.

FIG. 6 is a schematic diagram of a controller system 600, in accordance with some embodiments. The controller system 600 generates output control signals for controlling operations of the processing chamber(s) 412 and other components of semiconductor processing system 410, the fluid supply system 420, the power supply 430, and the acoustic sensor 310, in accordance with some embodiments. The controller system 600 receives input signals from the processing chamber(s) 412 and other components of semiconductor processing system 410, the fluid supply system 420, the power supply 430, and the acoustic sensor 310, in accordance with some embodiments.

The controller system 600 includes a processor 602, an input/output (I/O) device 604, a memory 606, and a network interface 608 each communicatively coupled via a bus 610 or other interconnection communication mechanism.

The processor 602 is arranged to execute and/or interpret one or more set of instructions 612 stored in the memory 606. In some embodiments, the processor 602 is a central processing unit (CPU), a multi-processor, a distributed processing system, an application specific integrated circuit (ASIC), and/or a suitable processing unit.

The I/O device 604 is coupled to external circuitry. In some embodiments, the I/O interface 604 includes a keyboard, keypad, mouse, trackball, trackpad, and/or cursor direction keys for communicating information and commands to the processor 602.

The memory 606 (also referred to as a computer-readable medium) includes a random access memory or other dynamic storage device, communicatively coupled to the bus 610 for storing data and/or instructions for execution by the processor 602. In some embodiments, the memory 606 is used for storing temporary variables or other intermediate information during execution of instructions to be executed by the processor 602. In some embodiments, the memory 606 also includes a read-only memory or other static storage device coupled to the bus 610 for storing static information and instructions for the processor 602. In some embodiments, the memory 606 is an electronic, magnetic, optical, electromagnetic, infrared, and/or a semiconductor system (or apparatus or device). For example, the memory 606 includes a semiconductor or solid-state memory, a magnetic tape, a removable computer diskette, a random access memory (RAM), a read-only memory (ROM), a rigid magnetic disk, and/or an optical disk. In some embodiments using optical disks, the memory 606 includes a compact disk-read only memory (CD-ROM), a compact disk-read/write (CD-R/W), and/or a digital video disc (DVD).

The memory 606 is encoded with, i.e., storing, the computer program code, i.e., a set of executable instructions 612, for controlling one or more components of the semiconductor processing system 410, the fluid supply system 420, the power supply 430, and the acoustic sensor 310 and causing the controller system 600 to perform the method 500. In some embodiments, the memory 606 also stores information needed for performing the method 500 as well as information generated during performing the method 500.

The network interface 608 includes a mechanism for connecting to a network 609, to which one or more other computer systems are connected. In some embodiments, the network interface 608 includes a wired and/or wireless connection mechanism. The network interface 608 includes wireless network interfaces such as BLUETOOTH, WIFI, WIMAX, GPRS, or WCDMA; or wired network interface such as ETHERNET, USB, or IEEE-1394. In some embodiments, the controller system 600 is coupled with one or more components of the semiconductor processing system 410, the fluid supply system 420, the power supply 430, and the acoustic sensor 310 via the network interface 608. In some embodiments, the controller system 600 is directly coupled with one or more components of the semiconductor processing system 410, the fluid supply system 420, the power supply 430, and the acoustic sensor 310, e.g., with the components coupled to the bus 610 instead of via the network interface 608.

One aspect of this description relates to a buffer for holding a pipe adapted to transport a fluid. The buffer includes a base, a plurality of fingers extending outwardly from a first side of the base. A first finger of the plurality of fingers and a second finger of the plurality of fingers define a cavity for receiving the pipe. The buffer further includes at least one roller on a second side of the based opposite the first side. In some embodiments, the first finger has a length less than a length of the second finger. In some embodiments, the second finger includes a ridge protruding toward the first finger. The ridge defines an open end of the cavity with the first finger. In some embodiments, the first finger extends outwardly from a first end of the base, and the second finger extends outwardly from a central portion of the base. In some embodiments, a third finger of the plurality of fingers extends outwardly from a second end of the base opposite the first end. The second finger is between the first finger and the third finger. In some embodiments, the second finger and the third finger have a same length. In some embodiments, the second finger and the third finger have different lengths. In some embodiments, the second finger and the third finger define another cavity for receiving an electrical cable, the another cavity having a dimension less than a dimension of the cavity. In some embodiments, the at least one roller is a universal roller configured to move the buffer in any direction. In some embodiments, the at least one roller comprises a rounded bottom. In some embodiments, the buffer includes a material having a coefficient of friction less than 0.1. In some embodiments, the buffer includes polytetrafluoroethylene (PTFE), perfluoroalkoxy (PFA), fluorinated poly ethylene propylene (FPEP), polyvinylidene fluoride (PVDF), polysulfone, or polyether ether ketone (PEEK).

Another aspect of this description relates to an arrangement in a semiconductor fabrication facility. The arrangement includes a semiconductor processing system comprising a processing chamber, a fluid supply system comprising a pipe connected to the processing chamber and configured to transport a fluid, a power supply comprising an electrical cable connected to processing chamber, and a buffer placed on a support plate and adapted to elevate the pipe and the electrical cable from the support plate. The buffer includes a base, a plurality of fingers on a first side of the base, and a roller on a second side of the based opposite the first side and contacting the support plate. The plurality of fingers includes a first finger extending outwardly from a first end of the base, a second finger extending outwardly from a central portion of the base, and a third finger extending outwardly from a second end of the base opposite the first end. The first finger and the second finger define a first cavity for receiving the pipe, and the second finger and the third finger define a second cavity for receiving the electrical cable. The arrangement further includes an acoustic sensor adapted to detect acoustic waves generated by the roller. In some embodiments, the second finger includes a ridge protruding toward the first finger. The ridge defines an open end of the cavity with the first finger. In some embodiments, the support plate includes a metal, a wood, or a plywood. In some embodiments, the buffer includes a material having a coefficient of friction lower that a coefficient of friction of the support plate. In some embodiments, the acoustic sensor is an ultrasonic sensor. In some embodiments, the arrangement further includes a sensor control unit adapted to analyze changes in frequencies of the acoustic waves.

Still another aspect of this description relates to a method of monitoring wear of a buffer. The method includes holding a pipe for transporting a fluid and an electrical cable using a buffer placed on a support plate. The buffer includes a base, a plurality of fingers on a first side of the base, and a roller on a second side of the based opposite the first side and contacting the support plate. The plurality of fingers includes a first finger extending outwardly from a first end of the base, a second finger extending outwardly from a central portion of the base, and a third finger extending outwardly from a second end of the base opposite the first end. The first finger and the second finger define a first cavity for receiving the pipe, and the second finger and the third finger defines a second cavity for receiving the electrical cable. The method further includes detecting acoustic waves generated by the roller on the support plate. The method further includes analyzing changes in frequencies of the acoustic waves to determine an extent of the wear of the roller over time. The method further includes triggering an alert when an increase in the frequencies of the acoustic waves exceeds a predetermined threshold value. In some embodiments, the method further includes replacing the buffer after the alert is triggered.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A buffer for holding a pipe adapted to transport a fluid, comprising:
   a base;
   a plurality of fingers extending outwardly from a first side of the base, wherein a first finger of the plurality of fingers and a second finger of the plurality of fingers define a cavity for receiving the pipe, the second finger comprises a ridge protruding from a surface of the second finger, the ridge protrudes toward the first finger, the ridge protrudes toward the first finger, the first finger extends outwardly from a first end of the base, and the second finger extends outwardly from a central portion of the base, and a third finger of plurality of fingers extends outwardly from a second end of the base opposite the first end, wherein the second finger is between the first finger and the third finger; and
   at least one roller on a second side of the base opposite the first side.

2. The buffer of claim 1, wherein the first finger has a length less than a length of the second finger.

3. The buffer of claim 1, wherein the ridge defines an open end of the cavity with the first finger.

4. The buffer of claim 1, wherein the second finger comprises a planar top surface, and the ridge is between the planar top surface and the base.

5. The buffer of claim 1, wherein the ridge has a tapered profile.

6. The buffer of claim 1, wherein the second finger and the third finger have a same length.

7. The buffer of claim 1, wherein the second finger and the third finger have different lengths.

8. The buffer of claim 1, wherein the second finger and the third finger define another cavity for receiving an electrical cable, the another cavity having a dimension less than a dimension of the cavity.

9. The buffer of claim 1, wherein the at least one roller is a universal roller configured to move the buffer in any direction.

10. The buffer of claim 1, wherein the at least one roller comprises a rounded bottom.

11. The buffer of claim 1, wherein the buffer comprises a material having a coefficient of friction less than 0.1.

12. The buffer of claim 1, wherein the buffer comprises polytetrafluoroethylene, perfluoroalkoxy, fluorinated poly ethylene propylene, polyvinylidene fluoride, polysulfone, or polyether ether ketone.

13. An arrangement in a semiconductor fabrication facility, comprising:
- a semiconductor processing system comprising a processing chamber;
- a fluid supply system comprising a pipe connected to the processing chamber and configured to transport a fluid;
- a power supply comprising an electrical cable connected to processing chamber;
- a buffer placed on a support plate and adapted to elevate the pipe and the electrical cable from the support plate, the buffer comprising:
  - a base,
  - a plurality of fingers on a first side of the base, wherein the plurality of fingers comprises a first finger extending outwardly from a first end of the base, a second finger extending outwardly from a central portion of the base, and a third finger extending outwardly from a second end of the base opposite the first end, wherein the first finger and the second finger define a first cavity for receiving the pipe, and the second finger and the third finger define a second cavity for receiving the electrical cable, and
  - a roller on a second side of the base opposite the first side and contacting the support plate; and
- an acoustic sensor adapted to detect acoustic waves generated by the roller.

14. The arrangement of claim 13, wherein the second finger comprises a ridge protruding towards the first finger, wherein the ridge defines an open end of the first cavity with the first finger.

15. The arrangement of claim 13, wherein the support plate comprises a metal, a wood, or a plywood.

16. The arrangement of claim 13, the buffer comprises a material having a coefficient of friction lower that a coefficient of friction of the support plate.

17. The arrangement of claim 13, wherein the acoustic sensor is an ultrasonic sensor.

18. The arrangement of claim 13, further comprising a sensor control unit adapted to analyze changes in frequencies of the acoustic waves.

19. A buffer for holding a pipe adapted to transport a fluid, comprising:
- a base;
- a plurality of fingers extending outwardly from a first side of the base, wherein a first finger of the plurality of fingers and a second finger of the plurality of fingers define a first cavity for receiving the pipe, the second finger and a third finger of the plurality of fingers define a second cavity for receiving an electrical cable, and a shape of the second cavity is different from a shape of the first cavity; and
- at least one roller on a second side of the base opposite the first side.

20. The buffer of claim 19, wherein the at least one roller is opposite the first cavity.

* * * * *